United States Patent
Karnin et al.

(10) Patent No.: US 9,596,205 B2
(45) Date of Patent: Mar. 14, 2017

(54) SYSTEM AND METHOD FOR MAILING LIST IDENTIFICATION AND REPRESENTATION

(71) Applicant: YAHOO! INC., Sunnyvale, CA (US)

(72) Inventors: Zohar Karnin, Haifa (IL); Michal Aharon, Haifa (IL); Edo Liberty, Haifa (IL); Yoelle Maarek Smadja, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 430 days.

(21) Appl. No.: 13/966,458

(22) Filed: Aug. 14, 2013

(65) Prior Publication Data
US 2015/0052203 A1    Feb. 19, 2015

(51) Int. Cl.
G06F 15/16 (2006.01)
H04L 12/58 (2006.01)

(52) U.S. Cl.
CPC .............. *H04L 51/22* (2013.01); *H04L 51/16* (2013.01)

(58) Field of Classification Search
CPC ........................................................ H04L 51/16
USPC .......................................................... 709/206
See application file for complete search history.

(56) References Cited

U.S. PATENT DOCUMENTS

| | | | |
|---|---|---|---|
| 6,704,772 B1 * | 3/2004 | Ahmed | G06Q 10/107 709/206 |
| 7,752,279 B2 * | 7/2010 | Hardy | G06Q 10/107 709/206 |
| 8,458,268 B1 * | 6/2013 | Cooley | G06Q 10/107 709/206 |
| 8,606,864 B2 * | 12/2013 | Buchheit | G06Q 10/107 455/410 |
| 2002/0199095 A1 * | 12/2002 | Bandini | H04L 12/585 713/151 |
| 2005/0080855 A1 * | 4/2005 | Murray | H04L 12/58 709/206 |
| 2007/0073871 A1 * | 3/2007 | Adams | G06Q 10/107 709/224 |

(Continued)

OTHER PUBLICATIONS

Dozois, Michelle L. "The Pitfalls of Group Texting: 4 Things You Need to Know Before You Hit Send". Nov. 7, 2011. http://www.thedatereport.com/dating/communication/2013-group-texting-messaging-101-avoid-reply-all-disasters/ . pp. 1-6.*

*Primary Examiner* — Imad Hussain
(74) *Attorney, Agent, or Firm* — James J. DeCarlo; Greenberg Traurig

(57) ABSTRACT

Disclosed is a system and method for managing mailing list newsletter messages for a recipient user, and organizing such messages in accordance with a receiving user's interests. The present disclosure enables novel organizational tools for emails by intuitively organizing received newsletters and providing highly visible features within a user's inbox respective the newsletters. Organization of received newsletters is ensured through ranking users' mailing lists according to his/her interest in them, based on actions made by the respective user, in addition to actions of other users receiving the same newsletters. Additionally, upon reception of such newsletters, the present disclosure provides a specialized view, in addition to added functionality within a user's inbox, thereby enhancing a user's experience and engagement with received messages of a newsletter.

19 Claims, 5 Drawing Sheets

(56) References Cited

U.S. PATENT DOCUMENTS

| | | | | |
|---|---|---|---|---|
| 2008/0294727 | A1* | 11/2008 | Moody | G06Q 10/107 709/206 |
| 2009/0222333 | A1* | 9/2009 | Rivas | G06Q 10/10 705/14.53 |
| 2010/0030798 | A1* | 2/2010 | Kumar | G06F 17/30873 707/737 |
| 2010/0211644 | A1* | 8/2010 | Lavoie | H04L 51/26 709/206 |
| 2011/0231499 | A1* | 9/2011 | Stovicek | H04M 1/72547 709/206 |
| 2012/0150619 | A1* | 6/2012 | Jacob Sushil | G06Q 30/0207 705/14.39 |
| 2013/0018964 | A1* | 1/2013 | Osipkov | G06Q 10/107 709/206 |
| 2013/0179522 | A1* | 7/2013 | Hardy | G06Q 10/107 709/206 |
| 2013/0262593 | A1* | 10/2013 | Srikrishna | H04L 12/5885 709/206 |
| 2014/0012927 | A1* | 1/2014 | Gertzfield | G06Q 50/01 709/206 |
| 2014/0237055 | A1* | 8/2014 | Burrell | H04L 51/28 709/206 |
| 2014/0304615 | A1* | 10/2014 | Coe | G06F 3/04842 715/752 |

\* cited by examiner

402 Monitor message activity of all email accounts to identify senders that send messages to a sufficiently large group of users

404 For every message sent by an identified sender within a sufficiently small window, determine entire list of recipients for each message

406 Cluster messages into newsletters based on corresponding list of recipients

408 Assign interest scores to newsletters based on actions by recipients

410 Rank newsletters based on interest scores

412 Deliver messages in accordance with newsletter designation to recipients' inbox

SYSTEM AND METHOD FOR MAILING LIST IDENTIFICATION AND REPRESENTATION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to managing a user's email account, and more particularly, to systems and methods for managing email newsletters sent to a user's email inbox.

RELATED ART

Electronic mail ("email") usages have become omnipresent in everyday use for online users. Commercial senders or merchants send many of the messages that users receive in their e-mail accounts. These messages include advertisements, promotions, coupons, royalty program messages, institution employee announcements, school notifications, newsletters, and the like. Additionally, modern active email users receive large numbers of these types of messages from mailing lists.

SUMMARY

The present disclosure addresses failings in the art by providing systems and methods for identifying messages originating from mailing lists, and organizing such messages in accordance with a receiving user's interests. Thus, the present disclosure enables novel organizational tools for emails by intuitively organizing received newsletters and providing highly visible features within a user's inbox respective the newsletters. As discussed herein, organization of received newsletters is ensured through ranking users' mailing lists according to his/her interest in them, based on actions made by the respective user, in addition to actions of other users receiving the same newsletters. Additionally, upon reception of such newsletters, the present disclosure provides a specialized view within a user's inbox which can include, but is not limited to, a brief description of each newsletter and the number of messages received respective the newsletter. Also, from a user's inbox respective a newsletter grouping, functionality is provided enabling creation or opening of a forum (or group) hosted by the email provider (e.g., Yahoo!®) for recipients of the newsletter.

In accordance with one or more embodiments, a method is disclosed which includes determining, via a computing device, a first sender from a plurality of senders, said plurality of senders communicating a plurality of messages over a network addressed to a plurality of recipients, said first sender associated with a subset of said messages sent within a predetermined time period; identifying, via the computing device, each recipient of each message of said subset; determining, via the computing device, a recipient listing associated with the first sender, said recipient listing comprising a list of identifiers for each identified recipient; clustering, via the computing device, each of said subset of messages into a message group based on said recipient listing, said clustering comprising grouping each message sent from said first sender addressed to the recipients on the recipient listing; and facilitating display, via the computing device, of each message within said message group as a message thread within an inbox associated with each identified recipient.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for managing email newsletters sent to a user's email inbox.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure.

DESCRIPTION OF EMBODIMENTS

Figure 1:
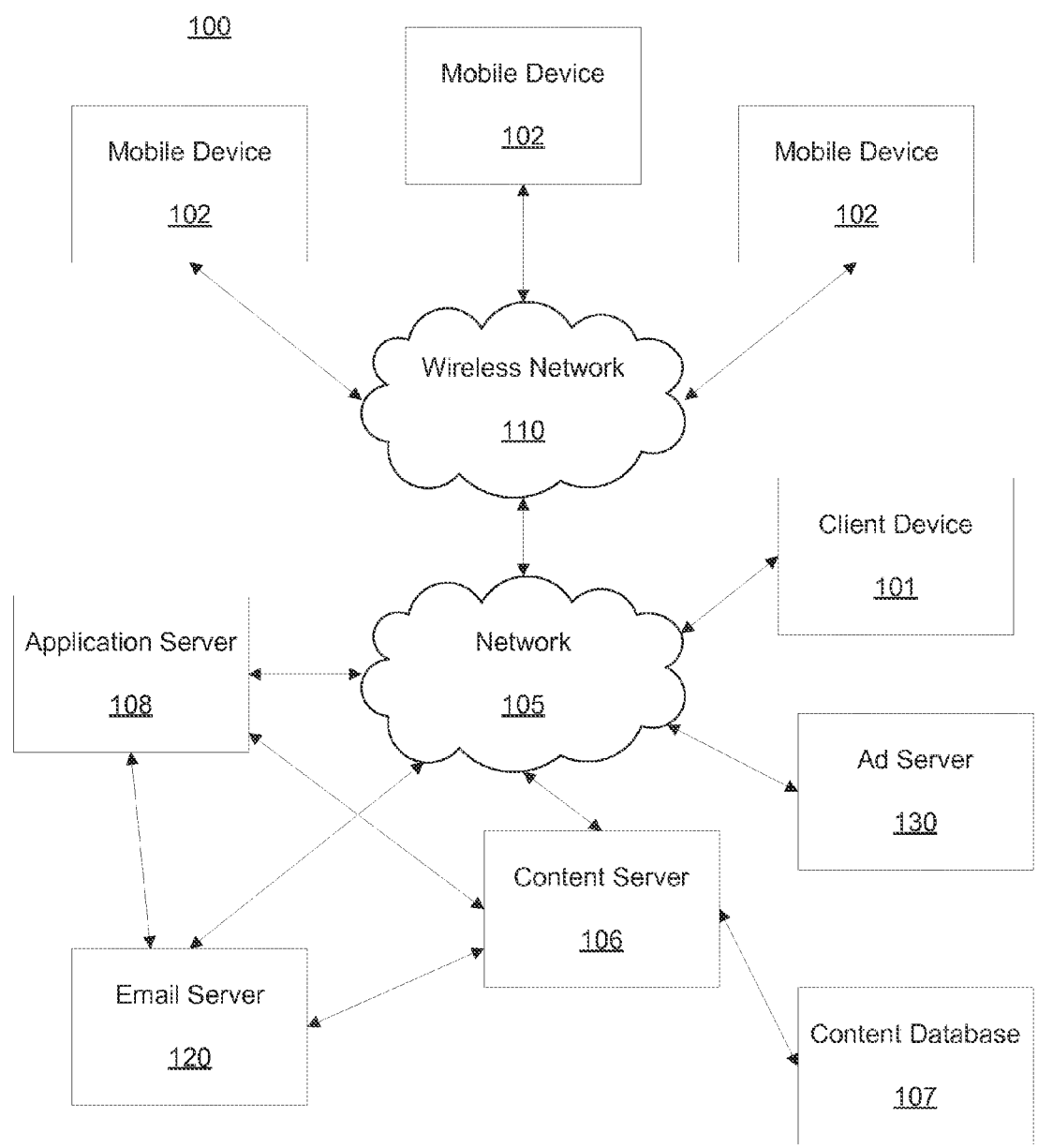
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate embodiments, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, fobr example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®t, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Generally, the present disclosure describes techniques for clustering email messages received from the same sender. More particularly, the present disclosure provides systems and methods for grouping mailing list emails into newsletters based on the identity of the sender of such messages ultimately for presentation within a recipient's inbox. By way of background, a mailing list is a list of email addresses. That is, a mailing list can comprise a listing of email addresses for users who have signed up for a disbursement of emails (or "email blast"). For example, a new artist is attempting to spread the word around regarding an art show; therefore, the artist can collect email addresses for all of his contacts into a mailing list. Thus, upon the artist desiring to send a message informing the public about an art opening with his work, he can send the message via his mailing list. It should be understood that recipients of mailing list may vary slightly over time due to new people subscribing to the newsletter, and/or existing users unsubscribing. Further, should the artist desire to send numerous emails to the mailing list, this would be categorized as a newsletter. Thus, a newsletter is a sequence of email messages, where each message is sent to the members of a mailing list by the same sender.

The present disclosure distinguishes between an email sent solely to a single user, and an email sent as part of a newsletter thread (e.g., a message sent to an entire group). Additionally, the disclosure provides systems and methods for assigning new incoming messages to its appropriate newsletter. Therefore, the systems and methods discussed herein perform clustering of messages sent to a mailing list into newsletters (or message group) for display within a user's inbox as a single thread. Additionally, a user's interests in the newsletter, coupled with the global interest in the newsletter from other users on the mailing list can be used to intuitively rank users' interest in the newsletter, thereby impacting the display of the newsletter thread in users' inbox. That is, the systems and methods discussed herein have the ability to rank user's incoming messages according to a user's interest in an associated newsletter based on actions made by the user respective the newsletter, in addition to other recipients with previous email messages from the same newsletter.

Thus, the present disclosure provides a new organizational tool(s) for newsletter messages (e.g., emails) through intuitive organization respective mailing list recipients' actions. This enables the user's inbox to provide highly visible features within a user's inbox respective the newsletters. Such features include, but are not limited to, a brief description of the newsletter and the number of messages within the newsletter (the thread). Additionally, from a user's inbox respective a newsletter thread, functionality is provided enabling creation or opening of a forum hosted by the email provider (e.g., Yahoo!®) for recipients of the newsletter. Thus, from the newsletter thread in a user's inbox, the user will be able to open a forum (e.g., within Yahoo! Groups®) to discuss the topics or content of the newsletter with other recipients of the newsletter (or on the mailing list). Furthermore, the systems and methods discussed herein will enable a user(s) or recipient to unsubscribe to the newsletter directly from the newsletter thread, without having to open the thread and/or activate (or click on) any link within any respective message. This functionally will be discussed in more detail below.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, email server 120 and advertising ("ad") server 130.

One embodiment of mobile devices 102-103 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (IHDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the email server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-104. In some embodiments, applications, such as a photo-sharing or viewing application (e.g., Flickr®, Instagram®, and the like), can be hosted by the application server 108. Thus, the application server 108 can store various types of applications and application related information including application data and user profile information. In another example, email server 120 can host email applications; therefore, the email server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
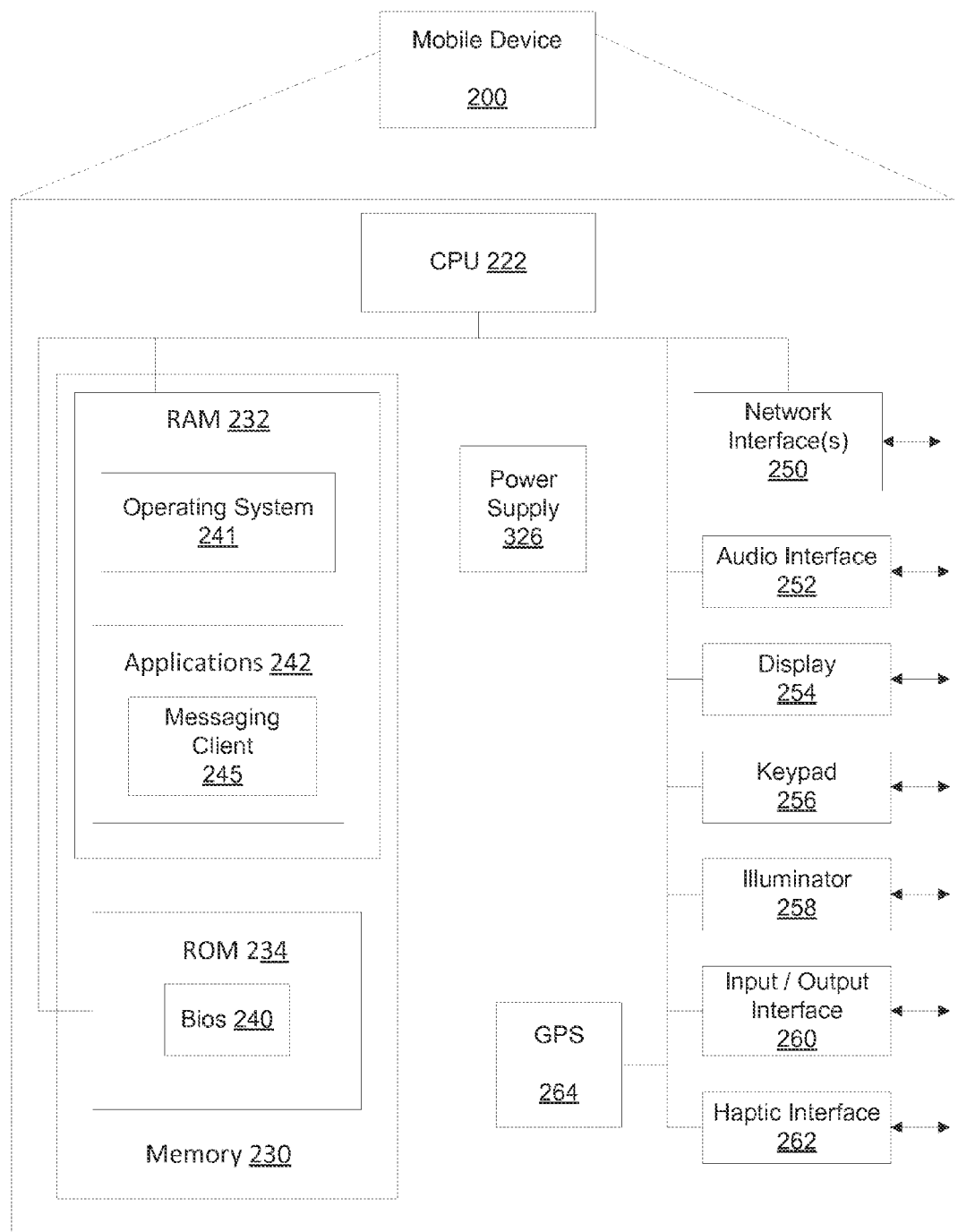
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described with reference to FIGS. 3-5.

Figure 3:
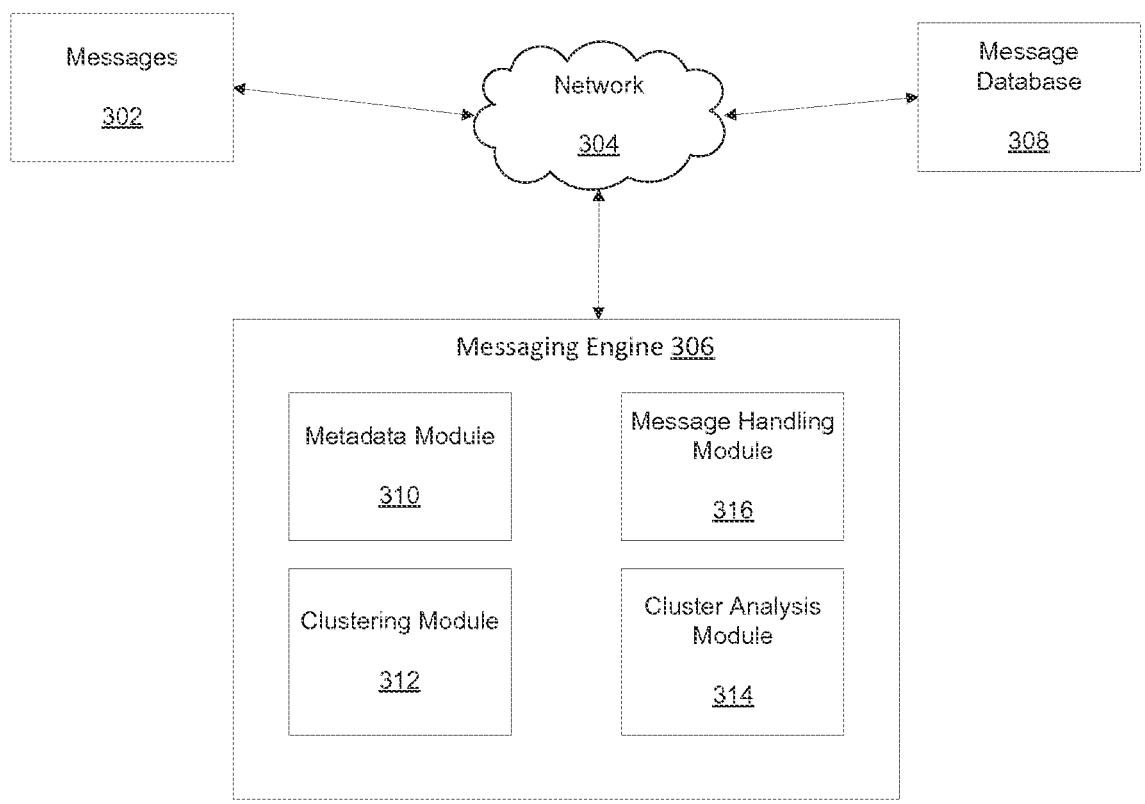
FIG. 3 is a schematic diagram illustrating components for identifying mailing list newsletters in accordance with some embodiments of the present disclosure.

FIG. 3 illustrates a block diagram illustrating system 300 that performs the automated classification of newsletters, as discussed herein. As discussed above, the present disclosure describes systems and methods for performing clustering (or grouping) of messages sent to a mailing list into newsletters for display within a user's inbox as a single thread. Additionally, a user's interests or actions respective a newsletter, coupled with the global activity respective messages of the newsletter from other users on the mailing list can be used to intuitively rank users' interest in the newsletter, thereby impacting the display of the newsletter thread in users' inbox. That is, the systems and methods discussed herein have the ability to rank user's mailing lists according to a user's interest in an associated newsletter based on actions made by the user respective the newsletter, in addition to other recipients with previous email messages from the same newsletter. As discussed below, such actions can include, but are not limited to, a user reading, deleting, inserting into a mail folder, tagging, forwarding, and the like, a message.

System 300 of FIG. 3 includes a plurality of messages 302, a network 304, a message engine 306 and a database 308 for storing messages. The message engine 306 could be hosted by a web server, content provider, email service provider, a user's computing device, or any combination thereof. The plurality of messages 302 can be any type of message. Examples of such messages 302 can include HTML forms, email messages, comments to an article or website, online forum posts/entries, word processing documents, help desk messages, portable document format (PDF) documents and/or other types of documents. The messages 302 can be provided to the message engine 306 or accessed by a computer program or device that can access the messages. In some embodiments, the messages 302 can be stored in a database of stored messages 308, which is associated with an email provider, such as Yahoo! Mail®. The database 308 can be any type of database or memory that can store the messages 308. For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multi-media Message Service (MMS) messages, and the like) can be received and/or accessed and processed by the message engine 306 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 306, and the database of stored resources 308.

The message engine 306 includes a message handler module 316, a metadata module 310, a clustering module 312 and a cluster analysis module 314. It should be understood that the engine(s) and modules discussed herein are non-exhaustive, as additional or fewer engines and/or modules may be applicable to the embodiments of the systems and methods discussed herein. The message handler module 316 can receive the messages 302 from the network 304 and/or a server or access the messages 302 stored in the database of stored messages 308 and route the messages 302 to various users (i.e., recipients) of the message engine 306. In some embodiments, as discussed below, the message handler module 316 can identify that the message is associated with, or directed to a mailing list (e.g., listing of recipients), and can route the message to those recipients. In alternative embodiments, the message handler module 316 can determine a message 302 relates to a particular topic (e.g., product or service) based on the subject line, for example, and route the message 302 to a person or group of persons.

The metadata module 310 can add metadata to a message 302. As discussed in more detail below, the metadata that can be added to a message 302 can include an identifier signifying that a message, group of messages, or in some embodiments, a newsletter, has been sent from a specific sender. This, as discussed in more detail below, leads to the clustering of messages associated with the sender and mailing lists. Sender metadata can include, but is not limited to, data associated with the identity of the sender of the message 302, data associated with the message provider servicing the sender and/or providing the emails to the recipients of the mailing list and data associated with the relationship between the sender and the recipient(s) of the message 302. Additionally, in some embodiments, other types of metadata can be included or attached to messages, including but not limited to, the date, time, location, and other known or to be known information associated with a message. In some embodiments, metadata provided or handled by the metadata engine 310 can include data related to the flow or processing of the messages, for example, but not limited to, data associated with the recipient(s) of the message, data associated with the network or network type delivering the message, data associated with the provider servicing or providing the message (e.g., Yahoo!), data related to information for processing the message (e.g., intake processing information, status information, the date the message was received, the date the message was transferred), and data associated with labels, security (e.g., encryption), priority or keywords associated with the message.

In some embodiments, the message handler module 316 automatically invokes the metadata module 310 to add the sender metadata as the message handler module 316 receives a message 302 and/or routes a message 302 to a recipient. For example, the message handler module 316 can cause the metadata module 310 to add an identifier of the sender to the message (in addition to the date/time the message was received or transferred and the status of the message) as metadata. The metadata can be stored with the message 302 in the database 308.

The clustering module 312 can access the database 308 and cluster the messages to identify messages 302 associated with a sender based on the sender metadata. That is, as discussed below, the clustering module 312 can cluster messages from a sender into identifiable newsletters. Various known or to be known clustering algorithms can be used by the clustering module 312. For example, the clustering module 312 can use a distributed exchange algorithm to cluster the set of relevant resources and identify the sender (s) included in the set of relevant resources. As discussed in more detail below, in some embodiments, the clustering module 312 attempts to group the set of messages associated with a sender into various groupings until an optimal or near optimal grouping is identified. Thus, the messages contained in an optimal or near optimal grouping are all messages that are related to or sent by an identified sender to a specific mailing list.

According to some embodiments, the clustering module 312 can use various features of the messages as the basis for forming the clusters. For example, the features can include the metadata associated with the sender's of the messages and the content of the messages, such as the subject line or title, numbers, words, and/or phrases included in the messages. In some embodiments, an information retrieval/text mining algorithm, such as a term frequency-inverse document frequency algorithm, is applied to the messages 302 to identify the features to be the basis for forming clusters.

In some embodiments, the clustering module 312 can be used to identify messages that should not be grouped or clustered by the clustering module 312 in associated with a newsletter. For example, the clustering module 312 can identify that status of the message as a "one-off" or single message not associated with a mailing list. As a result, the message will not be clustered, and will be delivered to the user's inbox according to known techniques.

The cluster analysis module 314 can receive the clusters of messages generated by the clustering module 310 and analyze the messages contained in each cluster to identify a label/descriptor to be associated with each cluster (or newsletter). The label/descriptor can be any type of token, word, phrase, sentence, or a combination of features. In some embodiments, the label can be applied (or selected) to identify the sender of a set of messages (or newsletter) contained in the cluster or can be an arbitrary string in accordance to a naming convention specified by the message engine 306. In some embodiments, multiple clusters can be related to the same sender differentiated by different mailing lists or topics. For example, two clusters can be related to a group buying site: sender A, whereas cluster 1 relates to coupons for restaurants provided by sender A, and cluster 2 relates to deals for massages provided by sender A. In some embodiments, the cluster analysis module 314 can use various algorithms to analyze the resources contained in each cluster and generate a label for the cluster. For example, a term frequency-inverse document frequency algorithm can be applied to determine the word, phrase or combination of feature(s) that have the highest term frequency-inverse document frequency scores and use that feature(s) as the label for each cluster.

According to some embodiments, the cluster analysis module 314 can analyze the newsletters/clusters and determine metrics associated with each newsletter/cluster. For example, the cluster analysis module 314 can determine the number of messages associated with a sender/cluster versus the number of messages received (i.e. a frequency) within a specific time period. In some embodiments, the cluster analysis module 314 can determine the number of messages associated with a sender/cluster versus the number messages received during a specified time period (e.g., 40 messages per one minute). As indicated above, multiple clusters can be associated with a single topic and the cluster analysis module 314 can determine the number of messages associated with the topic by summing the number of messages in each cluster that have a common label.

FIG. 4 is a flow chart illustrating the process 400 for performing the systems and methods discussed herein. As discussed above, the present disclosure provides systems and methods for performing clustering (or grouping) of messages sent to a mailing list into newsletters for display within a user's inbox as a single thread. Additionally, a user's interests or actions respective a newsletter, coupled with the global activity respective the newsletter from other users on the mailing list can be used to intuitively rank users' interest in the newsletter, thereby impacting the display of the newsletter thread in users' inbox. That is, the systems and methods discussed herein have the ability to rank received newsletters based on the recipients on the mailing lists behavior respective messages within the newsletter. Process 400 details the steps performed by the components of system 300 for grouping messages sent to a mailing list into a newsletter (or cluster) and displaying such messages in a user's inbox. That is, Process 400 illustrates classifying (or clustering) emails sent to a mailing list, as discussed herein, according to some embodiments of the present disclosure.

In Step 402, communicated messages from a sender to a significantly large group of users/recipients (e.g., mailing list(s)) are analyzed to identify the sender's identity. That is, message traffic is monitored and analyzed to identify senders of email messages that are being communicated to mailing lists. In some embodiments, the monitoring of emails occurs from (or within) a single message platform, e.g., Yahoo! Mail®; and in some embodiments, the monitoring of messages occurs across multiple platforms, such as Yahoo! Mail®, Google Mail®, Hotmail®, and other personal and business email platforms, such as Microsoft Outlook®, and the like. This monitoring occurs by analyzing all incoming and outgoing messages from all known (and/or trusted) accounts, and parsing message traffic on a network to identify metadata (e.g., one or more header fields) associated with the electronic messages. According to some embodiments, the identified information from the header field of the messages is the information/data that identifies the sender. Such monitoring and/or analysis can be based any known or to be known learning/monitoring techniques and/or algorithms in order to efficiently and properly compile data attributes and details related to users on a network. For example, system 300 may implement an information retrieval/text mining algorithm, such as a term frequency-inverse document frequency algorithm, as applied to message traffic to identify the features to be the basis for forming clusters, as discussed above. In some embodiments, the size of the "large" group of users, or number of users on a mailing list can be based upon a value (or threshold) set by the email provider, service provider, content provider, system as a whole, or user, or a combination thereof. For example, a group could consist of a 40 recipients receiving a message from a sender within one minute. Therefore, the group is contingent upon a time frame respective a number of recipients (e.g., multiple recipients) receiving a message from a sender within a predetermined time span.

In Step 404, for every mail sent by an identified sender sent within a predetermined time period, the message recipients of such messages are identified. That is, messages that are sent by an identified sender from Step 402 are analyzed to determine whether they are occurring within a predetermined time period. If the messages are occurring within a predetermined time period, as discussed above (e.g., 40 recipients/minute), then the entire list of recipients for each message are stored as an identified mailing list (in the database). The recipients are identified based on analyzing each message by parsing the message metadata (e.g., recipient header fields) to identify the recipients. The recipient fields, including the To:, From:, Cc:, and Bcc: fields, typically contain the electronic addresses of the correspondents of the electronic message. The recipient fields may also include one or more mailing lists. For example, a company may have a mailing list called "Promotion Department" which maps to a list of electronic addresses for the individuals in the sales/accounting department of the company. When sending an electronic message to the individuals in the sales department, the sender may enter "Promotion Department" into the recipient field instead of inserting each individual's electronic message address. When the message is sent, the electronic message server recognizes the mailing list and expands the mailing list by forwarding a copy of the message to the addresses of each of the individuals represented by the mailing list.

According to some embodiments, when parsing a recipient field of electronic messages that includes a mailing list, the mailing list may be expanded by looking up the electronic message addresses for each of the individuals represented by the mailing list. For example, an email application may request the electronic message addresses represented by the mailing list from a message server or a directory service (e.g., Yahoo! Mail). The email application may associate each of the electronic message addresses represented by the mailing list at the time the message was sent into the appropriate recipient header field and stored in the database. The mailing list may also be stored in the database with the associated message.

In some embodiments, examples of other utilized header fields may include, but are not limited to, the subject of the message, the date the message was sent, a references field, and an in-reply-to field. It should be understood that one of skill in the art recognizes that the number and type of header fields found within an electronic message may vary depending on the message format used to create the electronic message. Thus, it should be understood that the disclosed systems and methods are capable of analyzing and grouping messages of different formats into the appropriate threads.

According to some embodiments, the predetermined time period may be defined by the date and/or time metadata of the messages (within the header fields), where the period of time is determined between the earliest message in a thread (or string) of messages from a sender and the latest occurring message. In some embodiments, if the date of a message falls within a date range or within either an amount of time prior to the earliest message in the message stream from a sender, or pre-interval, or within an amount of time after the latest occurring message from a sender, or post-interval, the message may be added to the newsletter cluster if it shares the same sender as the electronic message, as discussed below. In some embodiments, the pre-interval may be the same as the amount of time as the post-interval or a different amount of time. One of ordinary skill in the art will recognize that the pre-interval and the post-interval may be varied depending on the application of the systems and methods discussed herein. In some embodiments, the pre-interval and post-interval may be fixed. In some embodiments, the pre-interval and post-interval may be adjusted dynamically with the frequency of messages or other characteristics of the thread. For example, the pre-interval and/or post-interval may be smaller for a message frequency comprising a small number of messages than for a frequency of messages that have a lot of messages that are spread out over a period of time.

In Step 406, for each message sent to an identified mailing list, those messages are clustered. That is, messages traffic (or messages received from) the sender addressed to the identified mailing lists are grouped together into clusters. These clusters form newsletters, which as discussed above, are sequences of email messages, where each message is sent to the members of a specific (and here, identified) mailing list by the same sender. As discussed above, these clustered messages may also be designated by an identifier (or label). Therefore, the messages sent by a sender to a mailing list are clustered together based on their recipient group into newsletters. Further, as discussed below, these messages can be displayed in a user's inbox as a newsletter thread.

According to some embodiments, upon clustering messages, newsletter metadata (e.g., a header field) may be included (or added) in an electronic message to signify a message's clustering. As discussed above, this can be an identifier associated with the sender referred to as a newsletter header. As will be discussed herein, a newsletter header comprises information that may be used to identify a newsletter to which the message belongs or one or more messages to which the current electronic message is a response. For example, a newsletter header may comprise an identifier of a sender, a unique number or other identifier that is included in a header field of each message of a newsletter or newsletter group to identify a message is within a sequence of messages to a specific mailing list (within a predetermined period of time) sent from a specific sender. According to some embodiments, the newsletter header may list a parent message or all or a portion of the other messages that make up the same newsletter and/or newsletter group.

In some embodiments, if a message fails to share a common sender identifier within the message, or if no newsletter header is found within the electronic message, additional header fields of the electronic message may be used to identify one or more of the existing newsletters to which a message may belong. In some embodiment, the subject, the date, the content, and the correspondents of the electronic message may be compared to the subject, date range, and correspondents of each of the existing newsletters to identify one or more potential newsletters for clustering.

In Step 408, interest scores are assigned to the newsletters. These interest scores are based on actions performed by the recipients of the newsletter respective at least one message within the newsletter. Such actions to such messages include, but are not limited to, reading, deleting, inserting into a mail folder, tagging, forwarding, and the like. Therefore, actions taken by recipients impact the interest level a newsletter has on the recipients. In some embodiments, only the actions taken by a specific recipient impacts the interest score for a newsletter, as some recipients may be more interested in other materials than others. Also, in addition to actions impacting interest scores, a user's behavior and/or profile (e.g., preferences, profile information and the like) can be used to provide an indication of a user's interests which can impact the interest score of a newsletter.

In Step 410, the newsletters are ranked based on the interest scores. That is, the interest scores enable ranking of newsletters according to their importance, which, as discussed above, is based on actions (e.g., a user's previous actions) respective other emails belonging to the same newsletter. For example, if a user usually deletes emails belonging to a newsletter for "Hiking," then the interest score for the newsletter will be low, and subsequent emails within the newsletter thread will also be designated as having a low importance. In some embodiments, newsletters are ranked based on all user actions, and in some embodiments, interest scores are ranked only respective a given user.

By way of another example, User A is subscribed to both LinkedIn® news and Groupon®. User A reads every message received from the newsletter sent by LinkedIn®, but only checks the messages from Groupon® once a month. This behavior is detected and the two newsletters are ranked according to such behavior. Therefore, in the user's inbox, the order of the newsletters will be based on the ranking (or importance), and from this example, LinkedIn's newsletter thread will have priority to Groupon's.

Thus, in Step 412 the messages are displayed in a user's inbox. In some embodiments, the messages are denoted with an identifier in the inbox (e.g., tag, color, flag and the like) identifying that the message is associated with a specific newsletter. In some embodiments, the messages of a newsletter are displayed as a thread within the recipient's inbox, where in order to access the messages, the thread is opened (or expanded) and the messages within the thread appear an order of arrival, with the last message atop the listing. As discussed above, the display of the messages may also be ranked, whether individual messages or newsletter thread, where the higher ranking messages/threads appear with higher priority within the inbox. As discussed above, this ranking can be globally respective all users, or specific to given users.

According to some embodiments, the display in Step 412 can provide a specialized view for newsletters. The newsletters can be filtered according to newsletter type (based on sender/newsletter identifier). For example, if User A receives messages from User A's school, LinkedIn® news, eBay® daily deals, a seminar and Groupon®, the specialized view within the recipient's inbox discussed herein can contain a table of five (5) rows representing a newsletter thread, with one (1) row for each newsletter. Thus, in each row the number of new email messages (for each newsletter) can also be depicted signifying the population of emails within a thread (or dedicated to a newsletter). In some embodiments, the newsletter row may also display additional information including a description of the newsletter. This can be derived from the content of the messages, or provided with the subscription to the mailing list (e.g., newsletter). For example, for the Groupon® newsletter, the description may state "Deals" indicating that the newsletter's messages related to coupons/ads/deals available to the recipient(s).

According to some embodiments, the display, as in Step 412, can provide for automatic "unsubscribe" functionality. That is, a user that is registered to a newsletter may unsubscribe without having to press the link inside the message itself. For example, User A begins receiving email messages (or a newsletter) regarding "John's home improvement tips"; which is something the user did not subscribe to, does not recall subscribing to, or no longer desires to be subscribed to. In some embodiments, the messages might not contain a link that allows user A to unsubscribe. Even the message(s) does contain the "unsubscribe" link, pressing this link might redirect the user to a malicious website. As such, the system 300 will provide the user with an unsubscribe button (or option). This button can appear within the user's inbox, user interface area within the inbox provided by the mail provider, or other area within the user interface area displaying the user's inbox. In some embodiments, the button can be displayed as functionality available to the user from within the area (e.g., row) designated for the newsletter thread. It should be understood that the unsubscribe button (and such functionality) is not limited to being displayed at the top of the inbox (or within the message thread), and such discussion is not intended to limit the scope of the technology described herein. This button, provided by the service/mail provider, e.g., Yahoo!®, allows the user to safely unsubscribe without having to open the message or link, and thereby avoiding any unwanted or unwarranted activity. Thus, the unsubscribe button provides a more convenient way for the user to unsubscribe from the mailing list than having to scroll through the message and locate the unsubscribe link provided by the sender of the email (which is typically at the end of the message).

In embodiments where the messages contain an unsubscribe link, as is typical with most subscription emails, the emails will include an unsubscribe header. Thus, the message can be parsed by the message engine 306, which results in an unsubscribe button being displayed as discussed above. Therefore, once the user has requested to unsubscribe from a newsletter, any new email (or message) belonging to the mentioned newsletter will no longer appear in the inbox of the user, but can be directed to the "trash" or an "unsubscribe" folder.

According to some embodiments, functionality can be provided via the user's inbox by the email provider (e.g., Yahoo!) where a user can open (or create) a newsgroup or forum (for example, in Yahoo!® Groups) for recipients of the newsletter to conduct an open discussion. For example, User A is a recipient of the mailing list of her child's elementary school. User A would like to raise various suggestions and comments for the other parents (i.e., the other recipients of the school's newsletter). User A will not be able to identify the email addresses of the other recipients from the newsletter. Therefore, in order to contact the other recipients, User A can be provided with a link from her inbox respective the newsletter to open a group to post messages. In some embodiments, the link for opening a forum (or joining a forum) can be provided within the inbox area of the user's inbox, or as functionality provided within the newsletter thread display area (or within each message). Therefore, the service provider, e.g., Yahoo! Mail, can open a group that User A can post messages to and other recipients can actively read and post messages as well. This functionality (e.g., as a button) can be incorporated within the specialized newsletter view, as discussed above. That is, since an email message is linked to its newsletter, as discussed above (e.g., clustering and application of a sender identifier), the message is also linked to the list of recipients (e.g., mailing list) associated with that newsletter. This list of addresses provides a listing of users to the service provider hosting the forum indicating who has access to the forum, including the identity of the users' who can post and read posts in the opened forum.

Figure 5:
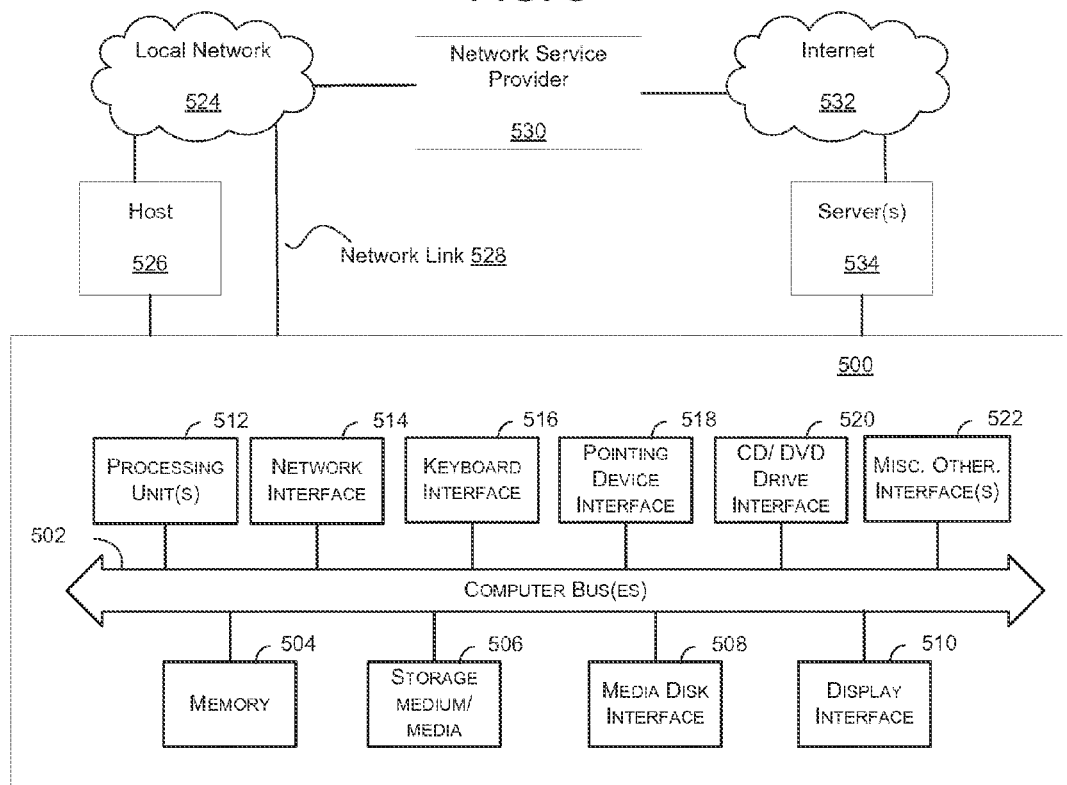
FIG. 5 is a block diagram illustrating architecture of a hardware device in accordance with one or more embodiments of the present disclosure.

As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein, e.g., one or more of process flows described herein. CPU 512 first loads computer executable process steps from storage, e.g., memory 504, computer readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those ski lied in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   determining, via a computing device, a first sender from a plurality of senders, said plurality of senders communicating a plurality of messages over a network addressed to a plurality of recipients, said first sender associated with a subset of said messages sent within a predetermined time period, said subset of messages being addressed to a number of recipients satisfying a threshold, and corresponding to a type of message associated with an identifier of the sender;
   identifying, via the computing device, each recipient of each message of said subset;
   filtering, via the computing device, said plurality of messages based on said identifier of the sender, and based on said filtering, identifying said subset of messages such that each message in said subset corresponds to said type;
   determining, via the computing device, a recipient listing associated with the first sender, said recipient listing comprising a list of identifiers for each identified recipient;
   clustering, via the computing device, each of said subset of messages into a message group based on said recipient listing, said clustering comprising grouping each message sent from said first sender addressed to the recipients on the recipient listing; and
   facilitating display, via the computing device, of each message within said message group as a message thread within an inbox associated with each identified recipient.

2. The method of claim 1, wherein for each subsequent message received from said first sender addressed to said recipient listing:
   grouping each subsequent message into said message group; and
   facilitating display of each subsequent message within said message thread.

3. The method of claim 1, further comprising:
   monitoring behavior responsive to each message within the message group;
   assigning an interest score to the message group based on said behavior; and
   ranking the message group based on the assigned interest score, wherein said facilitated display of the message thread is based on said ranking.

4. The method of claim 3, wherein said behavior comprises actions taken by all of the identified recipients on the recipient listing.

5. The method of claim 3, wherein said behavior comprises actions taken by each recipient of the recipient listing, wherein a recipient interest score is assigned to the message group for each recipient, wherein recipient ranking occurs for each recipient, and wherein said facilitated display of the message thread to each recipient is based on each recipient's interest score.

6. The method of claim 1, wherein said display of the message thread comprises an indication of the number of messages received for said message group.

7. The method of claim 1, wherein said displayed message thread is actionable by each recipient, wherein the message thread is expandable for viewing each received message within said message group.

8. The method of claim 1, wherein said message thread enables each recipient to automatically unsubscribe from the message group, wherein functionality to automatically unsubscribe is provided from the message thread.

9. The method of claim 1, wherein said message thread enables each recipient to open a forum associated with the message group to communicate with other recipients within the recipient listing, said forum authorizing only the recipients on the recipient listing to communicate on said forum associated with the message group.

10. The method of claim 1, wherein said predetermined time period is a time span during which the first sender sends a large number of messages to said recipient listing.

11. The method of claim 1, wherein said messages are email messages, and said identifiers are email addresses for each identified recipient.

12. The method of claim 1, further comprising:
selecting an advertisement based, at least in part, upon content associated with the messages in the message group, wherein said facilitated display comprises display of said advertisement in association with said message thread within each inbox.

13. A non-transitory computer-readable storage medium tangibly encoded with computer-executable instructions, that when executed by a processor associated with a computing device, performs a method comprising:
determining a first sender from a plurality of senders, said plurality of senders communicating a plurality of messages over a network addressed to a plurality of recipients, said first sender associated with a subset of said messages sent within a predetermined time period, said subset of messages being addressed to a number of recipients satisfying a threshold, and corresponding to a type of message associated with an identifier of the sender;
identifying each recipient of each message of said subset;
filtering said plurality of messages based on said identifier of the sender, and based on said filtering, identifying said subset of messages such that each message in said subset corresponds to said type;
determining a recipient listing associated with the first sender, said recipient listing comprising a list of identifiers for each identified recipient;
clustering each of said subset of messages into a message group based on said recipient listing, said clustering comprising grouping each message sent from said first sender addressed to the recipients on the recipient listing; and
facilitating display of each message within said message group as a message thread within an inbox associated with each identified recipient.

14. The non-transitory computer-readable storage medium of claim 13, wherein for each subsequent message received from said first sender addressed to said recipient listing:
grouping each subsequent message into said message group; and
facilitating display of each subsequent message within said message thread.

15. The non-transitory computer-readable storage medium of claim 13, further comprising:
monitoring behavior responsive to each message within the message group, wherein said behavior comprises actions taken by at least one of said identified recipients on said recipient listing;
assigning an interest score to the message group based on said behavior; and
ranking the message group based on the assigned interest score, wherein said facilitated display of the message thread is based on said ranking.

16. The non-transitory computer-readable storage medium of claim 13, wherein said display of the message thread comprises:
an indication of the number of messages received for said message group;
an actionable capability enabled for each recipient, wherein the message thread is expandable for viewing each received message within said message group;
an ability for each recipient to automatically unsubscribe from the message group, wherein functionality to automatically unsubscribe is provided from the message thread; and
an ability that enables each recipient to open a forum associated with the message group to communicate with other recipients within the recipient listing, said forum authorizing only the recipients on the recipient listing to communicate on said forum associated with the message group.

17. The non-transitory computer-readable storage medium of claim 13, further comprising:
selecting an advertisement based, at least in part, upon content associated with the messages in the message group, wherein said facilitated display comprises display of said advertisement in association with said message thread within each inbox.

18. A system comprising:
a processor;
a non-transitory computer-readable storage medium for tangibly storing thereon program logic for execution by the processor, the program logic comprising:
determination logic executed by the processor for determining a first sender from a plurality of senders, said plurality of senders communicating a plurality of messages over a network addressed to a plurality of recipients, said first sender associated with a subset of said messages sent within a predetermined time period, said subset of messages being addressed to a number of recipients satisfying a threshold, and corresponding to a type of message associated with an identifier of the sender;
identification logic executed by the processor for identifying each recipient of each message of said subset;
filtering logic executed by the processor for filtering said plurality of messages based on said identifier of the sender, and based on said filtering, identifying said subset of messages such that each message in said subset corresponds to said type;
determination logic executed by the processor for determining a recipient listing associated with the first sender, said recipient listing comprising a list of identifiers for each identified recipient;
clustering logic executed by the processor for clustering each of said subset of messages into a message group based on said recipient listing, said clustering comprising grouping each message sent from said first sender addressed to the recipients on the recipient listing; and display logic executed by the processor for facilitating display of each message within said message group as a message thread within an inbox associated with each identified recipient.

19. The system of claim 18, wherein said display of the message thread comprises:

an indication of the number of messages received for said message group;

an actionable capability enabled for each recipient, wherein the message thread is expandable for viewing each received message within said message group;

an ability for each recipient to automatically unsubscribe from the message group, wherein functionality to automatically unsubscribe is provided from the message thread; and an ability that enables each recipient to open a forum associated with the message group to communicate with other recipients within the recipient listing, said forum authorizing only the recipients on the recipient listing to communicate on said forum associated with the message group.

* * * * *